United States Patent
Chang et al.

(10) Patent No.: US 7,359,345 B2
(45) Date of Patent: Apr. 15, 2008

(54) SIGNALING METHOD BETWEEN MAC ENTITIES IN A PACKET COMMUNICATION SYSTEM

(75) Inventors: Jin-Weon Chang, Seoul (KR);
Hyun-Woo Lee, Suwon-shi (KR);
Kook-Heui Lee, Songnam-shi (KR);
Sung-Hoon Kim, Seoul (KR);
Sung-Ho Choi, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 1029 days.

(21) Appl. No.: 10/225,850

(22) Filed: Aug. 22, 2002

(65) Prior Publication Data

US 2003/0039270 A1     Feb. 27, 2003

(30) Foreign Application Priority Data

Aug. 24, 2001   (KR) ................ 2001-52613

(51) Int. Cl.
*H04B 7/212*     (2006.01)
*H04Q 7/00*     (2006.01)

(52) U.S. Cl. ................ 370/322; 370/329; 370/342

(58) Field of Classification Search ............... 370/322, 370/328–329, 338, 350, 335, 342, 441, 479
See application file for complete search history.

(56) References Cited

U.S. PATENT DOCUMENTS 6,693,892 B1 * 2/2004 Rinne et al. ............... 370/348
6,731,623 B2 * 5/2004 Lee et al. .................. 370/349
6,807,192 B2 * 10/2004 Terry ........................ 370/469
6,816,472 B1 * 11/2004 Dillon et al. ............... 370/331
2003/0016698 A1 * 1/2003 Chang et al. ............... 370/469
2003/0035403 A1 * 2/2003 Choi et al. ................. 370/342
2005/0063347 A1 * 3/2005 Sarkkinen et al. .......... 370/338

FOREIGN PATENT DOCUMENTS

EP     0 993 149     4/2000
WO    WO 00/78062   12/2000

OTHER PUBLICATIONS

French Preliminary Search Report dated Nov. 28, 2003 issued in a counterpart application, namely, Appln. No. 0210534000.
"3rd Generation Partnership Project; Technical Specification Group Radio Access Network; Packet Data Convergence Protocol (PDCP) Specification", Jun. 2001, pp. 1-26.

* cited by examiner

*Primary Examiner*—Chi Pham
*Assistant Examiner*—Tri H. Phan
(74) *Attorney, Agent, or Firm*—The Farrell Law Firm, PC

(57)     ABSTRACT

A signaling method between a MAC (Medium Access Control) layer entity of a transmission apparatus and a MAC layer entity of a reception apparatus in a packet communication system including the transmission apparatus and the reception apparatus wherein upon receiving a signaling request, the MAC layer entity of the transmission apparatus transmits a MAC signaling message including control information and a signaling indication indicating transmission of the control information and the MAC layer entity of the reception apparatus determines whether the MAC signaling message includes the signaling indication, and receives the control information included in the MAC signaling message, if the MAC signaling message includes the signaling indication.

13 Claims, 18 Drawing Sheets

SIGNALING METHOD BETWEEN MAC ENTITIES IN A PACKET COMMUNICATION SYSTEM

PRIORITY

This application claims priority to an application entitled "Signaling Method Between MAC Entities in a Packet Communication System" filed in the Korean Industrial Property Office on Aug. 24, 2001 and assigned Ser. No. 2001-52613, the contents of which are incorporated herein by reference.

BACKGROUND OF THE INVENTION

1. Field of the Invention

The present invention relates generally to a signaling method between peer-to-peer MAC-hs layers for HSDPA (High Speed Downlink Packet Access) in a CDMA (Code Division Multiple Access) communication system, and in particular, to a method for intermittently exchanging control information between MAC-hs entities on a Node B and a UE (User Equipment).

2. Description of the Related Art

In general, HSDPA (High Speed Downlink Packet Access) refers to HS-DSCH (High Speed-Downlink Shared Channel) for supporting high-speed downlink packet transmission and control channels related thereto in a CDMA communication system, and an apparatus, method and system therefor. In a CDMA communication system employing the HSDPA, the following three new techniques have been introduced in order to support the high-speed packet transmission.

First, AMCS (Adaptive Modulation and Coding Scheme) will be described. The AMCS adaptively determines a modulation technique and a coding technique of a data channel according to a channel condition between a cell and a user, thus increasing the overall utilization efficiency of the cell. A combination of the modulation technique and the coding technique is called "MCS (Modulation Coding Scheme)," and the MCS has a level of 1 to n. The AMCS adaptively determines a level of the MCS according to a channel condition of a user and a cell, thereby increasing the entire utilization efficiency.

Next, a description will be made of HARQ (Hybrid Automatic Retransmission Request), especially N-channel SAW HARQ (Stop and Wait Hybrid Automatic Retransmission Request). In the conventional ARQ, an ACK (acknowledgment) signal and a retransmitted packet are exchanged between a UE and a RNC (Radio Network Controller). However, in the HSDPA, an ACK and a retransmitted packet are exchanged between MAC (Medium Access Control) layers of a UE and a Node B. In addition, N logical channels are constructed to transmit a plurality of packets even in a state where ACK is not received. More specifically, in the existing SAW ARQ, a next packet cannot be transmitted before ACK for a previous packet is received. Therefore, it is necessary to await ACK, although it is possible to transmit a packet. However, in the N-channel SAW HARQ, a plurality of packets can be continuously transmitted on N number of channel even before ACK is received on a channel, thus increasing channel utilization efficiency. That is, if N logical channels are established between a UE and a Node B, and those logical channels can be identified by their channel numbers or their transmission time, the UE can determine a channel to which a packet received at a certain point belongs, and rearrange received packets in the right reception order.

Finally, FCS (Fast Cell Selection) will be described. The FCS allows an HSDPA UE (a UE employing the HSDPA) in a soft handover region to receive packets from only a cell in the best channel condition, thus reducing the overall interference. If another cell exhibits the best channel condition, the UE receives packets from the cell over an HS-DSCH, thus to minimize a transmission interruption time.

The HARQ technique newly proposed for the HSDPA service will be described in detail herein below.

A plurality of N-channel SAW HARQ protocol techniques have been proposed for the HSDPA, and those techniques can be classified into the following three techniques according to control information and their data transmission techniques in uplink/downlink. A first technique is a synchronous/synchronous transmission technique in which data retransmission over a downlink is synchronized to a channel over which original data was transmitted, and ACK/NACK transmission over an uplink is also synchronized with an HARQ channel. A second technique is an asynchronous/synchronous transmission technique, in which retransmission over a downlink is not restricted to a channel over which original data was transmitted, but is performed alternately asynchronously on different channels. A third technique is an asynchronous/asynchronous transmission technique, in which even ACK/NACK transmission over a downlink is not synchronized to a channel over which original data was transmitted.

FIG. 1 illustrates synchronous transmission by a Node B and synchronous/synchronous transmission by a UE for an HSDPA service. It is assumed in FIG. 1 that four (N) channels are used for transmission.

Referring to FIG. 1, a data block 101 received from an upper layer of a network (or a Node B, herein the terms "network" and "Node B" are used in the same meaning) is stored in a queue 102. The data block 101 stored in the queue 102 is provided to a channel sequencer (or distributor) 103, where the provided data block is distributed to transmitters 104, 105, 106 and 107 associated with the respective channels. The transmitters 104, 105, 106 and 107 sequentially transmit data blocks distributed by the channel distributor 103, and the transmitted data blocks are received at corresponding receivers 111, 113, 115 and 117 through a data channel 108. The data blocks received at the receivers 111, 113, 115 and 117 are provided to first to fourth retransmission decoders (or HARQ decoders) 112, 114, 116 and 118, respectively. The data blocks are analyzed by the corresponding HARQ decoders 112, 114, 116 and 118, and then transmitted to an upper layer of a UE.

While the data blocks are transmitted, corresponding signaling information is transmitted over a control channel. ACK/NACK information for the transmitted data blocks is transmitted from a UE to a network over a feedback channel. FIG. 1 is a diagram for explaining this concept, but an actual system may have a different structure. For example, though a plurality of the transmitters 104 to 107 and the receivers 111 to 117 are used in FIG. 1, one transmitter and one receiver can be used to transmit and receive a plurality of data blocks on a time division basis. In addition, although the data channel 108 is provided between the transmission side and the reception side, the transmission side has a memory buffer for the N HARQ channels. The reception side also has a combining memory for the N HARQ channels, and a buffer for gathering restored message sequences by a specified number and transmitting it to an upper layer.

The synchronous/synchronous transmission technique, a retransmission technique depending on a time relationship between data transmission over a downlink and ACK/NACK reception for the transmitted data, does not require sequence numbers. Therefore, in the downlink, a New/Continue (N/C) flag with a minimum of 1 bit transmitted over a control channel is needed to distinguish whether a transmitted data block is a new transmitted block or a retransmitted block, and ACK/NACK information on a feedback channel can also be transmitted with a minimum of 1 bit. This is because it is possible to distinguish data and ACK/NACK of each channel by time through synchronous transmission.

The asynchronous/synchronous transmission technique is similar in operation to the synchronous/synchronous transmission technique. However, since retransmission of a data block is allowed even for channels other than the channel over which the original data was transmitted, a downlink control channel further needs a channel processor number in addition to the 1-bit N/C flag. In the asynchronous/synchronous transmission technique, ACK/NACK information on a feedback channel is transmitted with a minimum of 1 bit, like in the synchronous/synchronous transmission technique.

The asynchronous/asynchronous transmission technique a channel processor number is needed in addition to the 1-bit N/C flag during transmission, and should transmit ACK/NACK information on a feedback channel with a sequence number for a downlink data block. This technique increases a signaling load, but has a relaxed restriction on transmission timing and a strong resistance to a possible error.

The above-described operation of the MAC layer for HSDPA employing the HARQ is a concept that has not been introduced in the existing mobile communication system, and the retransmission-related operation is performed in an RLC (Radio Link Control) layer.

FIG. 2 illustrates a multi-layered protocol structure in a W-CDMA (Wideband CDMA) communication system. In a mobile communication system, an RNC (Radio Network Controller) except a core network (or MSC (Mobile Switching Center)) is comprised of an RRC (Radio Resource Control) layer for controlling each element of a radio access network, an RLC (Radio Link Control) layer for managing a data packet received from an upper layer in a proper size, an MAC (Medium Access Control) layer for distributing/combining unit data blocks with a specified size into transport channels, and a physical layer (or Layer 1 (L1)) 230 for transmitting actual data blocks over a radio channel. The RRC layer belongs to Layer 3 (L3), and the RLC layer 210 belongs to Layer 2 (L2).

Signaling between a network and a UE is chiefly performed in the RRC and RLC entities. The RRC is designed to transmit a message procedure and control information for system information, RRC connection, and radio channel setup and reconfiguration. The RLC entity is designed to transmit a size of a window and ACK signaling of received data to control transmission and retransmission of data. However, the MAC entity has information for identifying a UE Id (Identification) and an upper layer logical channel in a header, but does not have a signaling message procedure between the network and the UE.

Since the W-CDMA communication system employing the HSDPA needs an HARQ function for the MAC layer in addition to an HARQ function for the RLC layer, its protocol structure should be modified correspondingly. Conventionally, the MAC entity is included in the RNC, so that the RLC and RRC entities are both installed in the RNC. However, in the HSDPA, a MAC-hs (MAC-high speed) entity is installed in a Node B transmission apparatus. The structural modification and the MAC entities will be separately described for a UE and a Node B (or network).

FIG. 3 illustrates a MAC structure of a UE. Referring to FIG. 3, MAC-d 330, a MAC entity for dedicated channels, performs a MAC function on dedicated logical channels such as a dedicated control channel (DCCH) and a dedicated traffic channel (DTCH). The dedicated logical channels, when they are mapped to a dedicated transport channel, are connected to a dedicated channel (DCH). When the dedicated logical channels are mapped to a common channel, data is transmitted to or received from MAC-c/sh 320 through a connection line to the MAC-d 330 and the MAC-c/sh 320. The MAC-c/sh 320, a MAC entity for common channels, exchanges data on common logical channels such as PCCH (Paging Control Channel), BCCH (Broadcast Control Channel), CCCH (Common Control Channel), CTCH (Common Traffic Channel) and SHCCH (Shared Control Channel) and exchange data with the MAC-d 330, with common transport channels such as PCH (Paging Channel), FACH (Forward Access Channel), RACH (Random Access Channel), CPCH (Common Packet Channel), USCH (Uplink Shared Channel) and DSCH (Downlink Shared Channel). Those entities receive a control command from the RRC entity through a control line shown in FIG. 2, and transmit a state report to the RRC. Such control information is achieved through MAC control.

The existing structure is comprised of only the MAC-d (MAC-dedicated) entity 330 for dedicated channels and the MAC-c/sh (MAC-common/shared) entity 320 for common (or shared) channels. However, as the existing structure adopts the HSDPA technique, it additionally introduces a MAC-hs (MAC-high speed) entity 310, thus providing a MAC function supporting HS-DSCH (High Speed-Downlink Shared Channel). The MAC-hs 310 is designed to be controlled by the RRC through MAC control. A message received from a Node B is restored into data through signal processing in a physical layer, and received at the MAC-hs entity 310 through an HS-DSCH transmission channel.

FIG. 4 illustrates a detailed structure of the MAC-c/sh. The MAC-c/sh will be described in more detail with reference to FIG. 4. The MAC-c/sh includes an 'add/read UE Id' part for adding/reading UE Id (Identification) to/from data exchanged with the MAC-d, a 'Scheduling/Priority Handing' part for transmission of transport channels such as RACH and CPCH, a 'TF selection' part for selecting the type of a Transport Format (TF), and an 'ACS (Access Service Class) selection' part. In addition, the MAC-c/sh includes a 'TCTF MUX (Target Channel Type Field Multiplexing)' part for attaching a header field for identifying common logical channels to data and multiplexing the header-attached data to respective transport channels, and a 'TFC selection' part for selecting TFC (Transport Format Combination) during the transmission of a transport channel USCH. As the HSDPA technique is introduced, the existing structure has a new connection to MAC-hs, while maintaining a function of the existing MAC-c/sh.

FIG. 5 illustrates a detailed structure of a MAC-hs layer newly defined as the HSDPA technique is introduced. The MAC-hs will be described in more detail with reference to FIG. 5. The MAC-hs performs an HARQ protocol function as a major HARQ function on an HS-DSCH channel. That is, the MAC-hs checks an error of a data block received from a radio channel, and performs generation and transmission of an ACK/NACK message to the MAC-c/sh. This entity has 'Associated Uplink/Downlink Signaling' radio control channels in order to frequently exchange HSDPA control information with UTRAN (UMTS (Universal Mobile Telecommunications System) Terrestrial Radio Access Network). This entity is controlled by the RRC.

FIG. 6 illustrates a MAC structure of a network. Referring to FIG. 6, MAC-d is designed to exchange data on dedicated logical channels DTCH and DCCH with a dedicated channel DCH and MAC-c/sh, like the MAC-d of the UE. However, the UTRAN includes a plurality of MAC-d's uniquely associated with the UEs, and the MAC-d's are connected to MAC-c/sh. The MAC-c/sh is also similar to that of the UE. These entities are all controlled by the RRC through MAC control.

As the HSDPA technique is introduced, the existing MAC structure includes a MAC-hs entity. The MAC-hs is designed to be arranged not in a radio network controller (RNC) but in a Node B. Therefore, data from an upper layer is transmitted through an interface Iub between an RNC and a Node B, and a control message for the MAC-hs is also transmitted through the interface Iub. The MAC-hs entity schedules transmission data, and is connected to a transmission channel HS-DSCH.

FIG. 7 illustrates a function of the existing MAC-c/sh. Referring to FIG. 7, the MAC-c/sh includes a 'Flow Control MAC-c/sh/MAC-d' function block for data exchange with the MAC-d, and a 'TCTF MUX/UE Id MUX' function block for identification between common logical channels PCCH, BCCH, SHCCH, CCCH, CTCH and dedicated logical channels from the MAC-d, and for UE identification. Further, the MAC-c/sh includes a 'Scheduling/Priority Handling/Demux' function block for common transport channels, and a 'TFC selection' function block for selecting TFC (Transport Format Combination) during data transmission over the common transport channels. When transmitting data over a transmission channel DSCH, the MAC-c/sh additionally includes a 'DL: code allocation' function block that allocates a code used for a downlink DSCH. As the HSDPA function is additionally introduced, the Flow Control function block is added to a route for transmitting data blocks to the MAC-hs.

FIG. 8 illustrates a function of the MAC-hs entity in more detail. Referring to FIG. 8, the MAC-hs entity has a function of processing data blocks on an HS-DSCH channel, and management on physical channel resources for HSDPA data is also processed by this entity. Data received at the MAC-hs from the MAC-c/sh of FIG. 7 is transmitted to a transmission channel HS-DSCH through a Flow Control function block for controlling a flow of the received data, an HARQ protocol function block for processing an HARQ-related protocol, a Scheduling/Priority Handling function block for determining a transmission point of data obtained by processing the received data according to the HARQ protocol, and a TFC selection function block. Unlike the MAC-d and the MAC-c/sh, the MAC-hs entity is arranged in a Node B, and directly connected to a physical layer. Therefore, the MAC-hs has 'Associated Uplink/Downlink Signaling' radio control channels in order to frequently exchange HSDPA-related control information with a UE through the physical layer.

Using the above-described entities, a control message needed to service high-speed packet data is generated and transmitted by RLC arranged in the Node B or the UE. Then, RLC of a reception side analyzes the control message and performs necessary operations according to the result of the analysis. A high-speed packet data service requires a short transmission unit and a rapid response. However, communication between RLC arranged in the RNC and RLC arranged in the UE has a long time delay, because the communication is performed through the RNC and the Node B. In addition, the HARQ technique is used for the high-speed packet data service. In this case, if it is necessary to reset a buffer memory for the HARQ, communication between MAC-hs of a transmission side and MAC-hs of a reception side must be performed. Therefore, the present invention provides a technique for enabling a message exchange between MAC-hs layers of a Node B and a UE.

SUMMARY OF THE INVENTION

It is, therefore, an object of the present invention to provide a signaling method between MAC-hs entities of a network and a UE in a packet communication system employing an HSDPA technique.

It is another object of the present invention to provide a method for coping with a signaling message error on N-channel SAW HARQ by introducing MAC-hs signaling in a packet communication system.

It is further another object of the present invention to provide a message transmission method for resetting MAC-hs as an RLC layer is reset, by introducing MAC-hs signaling in a packet communication system.

According to a first aspect of the present invention, there is provided a signaling method between a MAC layer entity of a transmission apparatus and a MAC layer entity of a reception apparatus in a packet communication system including the transmission apparatus and the reception apparatus. The method comprises the steps of: upon receiving a signaling request, transmitting a MAC signaling message including control information and a signaling indication indicating transmission of the control information by the MAC layer entity of the transmission apparatus; and determining by the MAC layer entity of the reception apparatus whether the MAC signaling message includes the signaling indication, and receiving the control information included in the MAC signaling message, if the MAC signaling message includes the signaling indication.

According to a second aspect of the present invention, there is provided a method for performing signaling to a MAC layer entity of a reception apparatus by a MAC layer entity of a transmission apparatus under the control of an RLC entity in a packet communication system including the transmission apparatus and the reception apparatus. The method comprises the steps of: if a signaling transport block is provided from the RLC entity, generating a MAC signaling message including the signaling transport block and a signaling indication indicating transmission of the signaling transport block; if a data transport block is provided from the RLC entity, generating a MAC data message including the data transport block; scheduling transmission time points of the MAC signaling message and the MAC data message; and transmitting the MAC signaling message and the MAC data message to the MAC layer entity of the reception apparatus at the corresponding scheduled transmission time points.

According to a third aspect of the present invention, there is provided a method for performing signaling to a MAC layer entity of a transmission apparatus by a MAC layer entity of a reception apparatus in a packet communication system including the transmission apparatus and the reception apparatus. The method comprises receiving a MAC signaling message transmitted from the MAC layer entity of the transmission apparatus and determining whether the MAC signaling message includes a signaling indication indicating transmission of control information; and receiving control information included in the MAC signaling message, if the MAC signaling message includes the signaling indication.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention provides an apparatus and method for generating signaling information by a MAC-hs entity of a transmission side and transmitting a data block with the signaling on the MAC-hs along with a signaling indication bit inserted in a MAC header. Further, the present invention provides an apparatus and method for receiving a data block with signaling on a MAC-hs entity at a reception side and recognizing the received data block.

Figure 1:
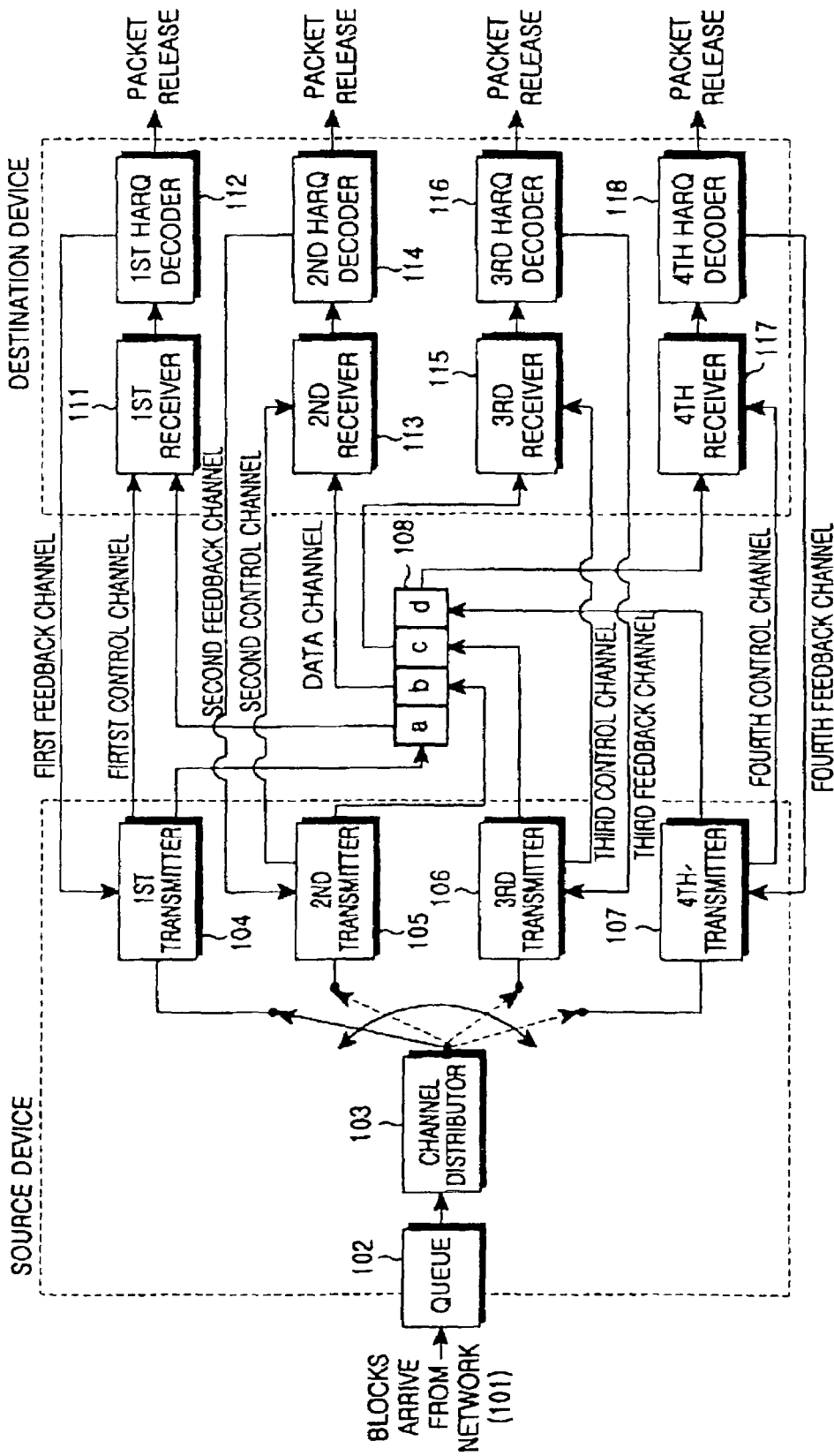
FIG. 1 illustrates data transmission/reception in a general CDMA communication system employing HSDPA.
Figure 2:
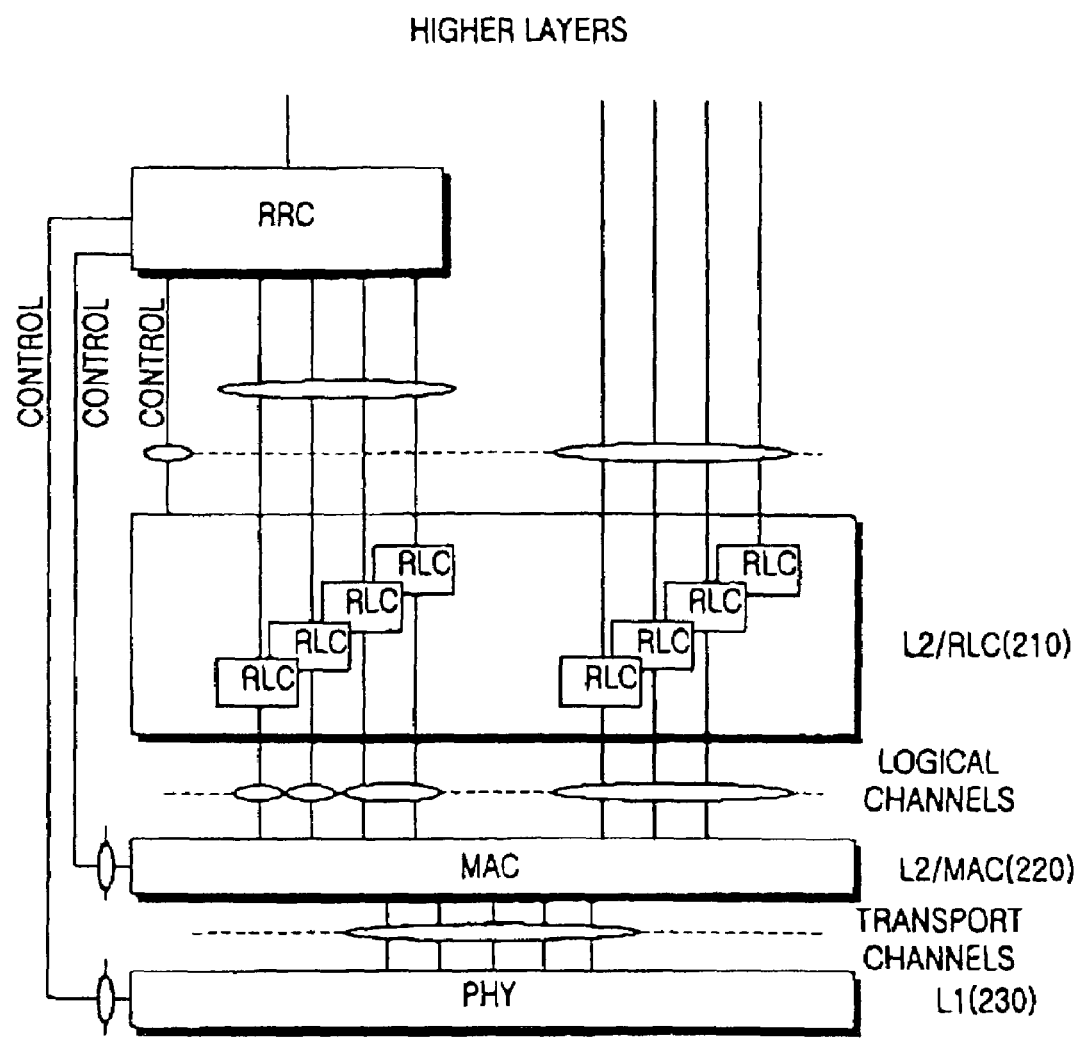
FIG. 2 illustrates a general multi-layered protocol structure in a CDMA communication system.
Figure 3:
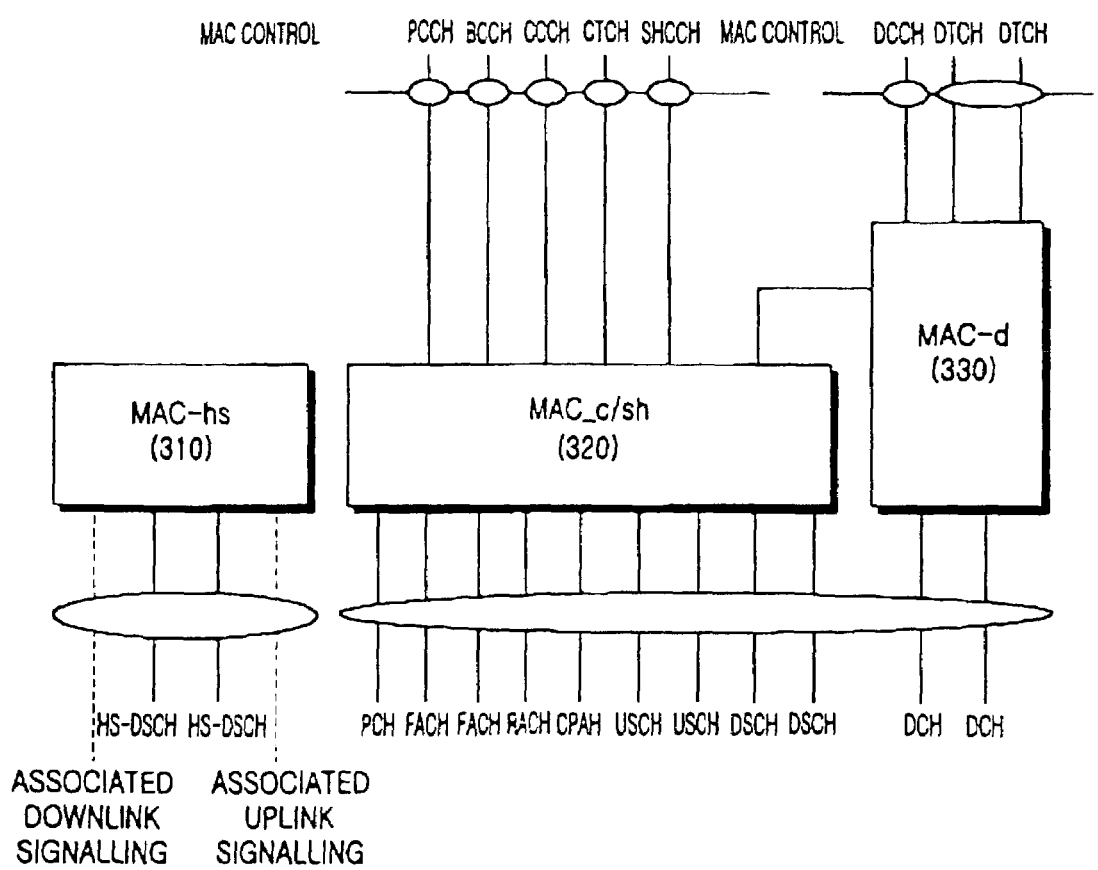
FIG. 3 illustrates a general structure of a MAC layer in the multi-layered protocol structure of a UE supporting the HSDPA.
Figure 4:
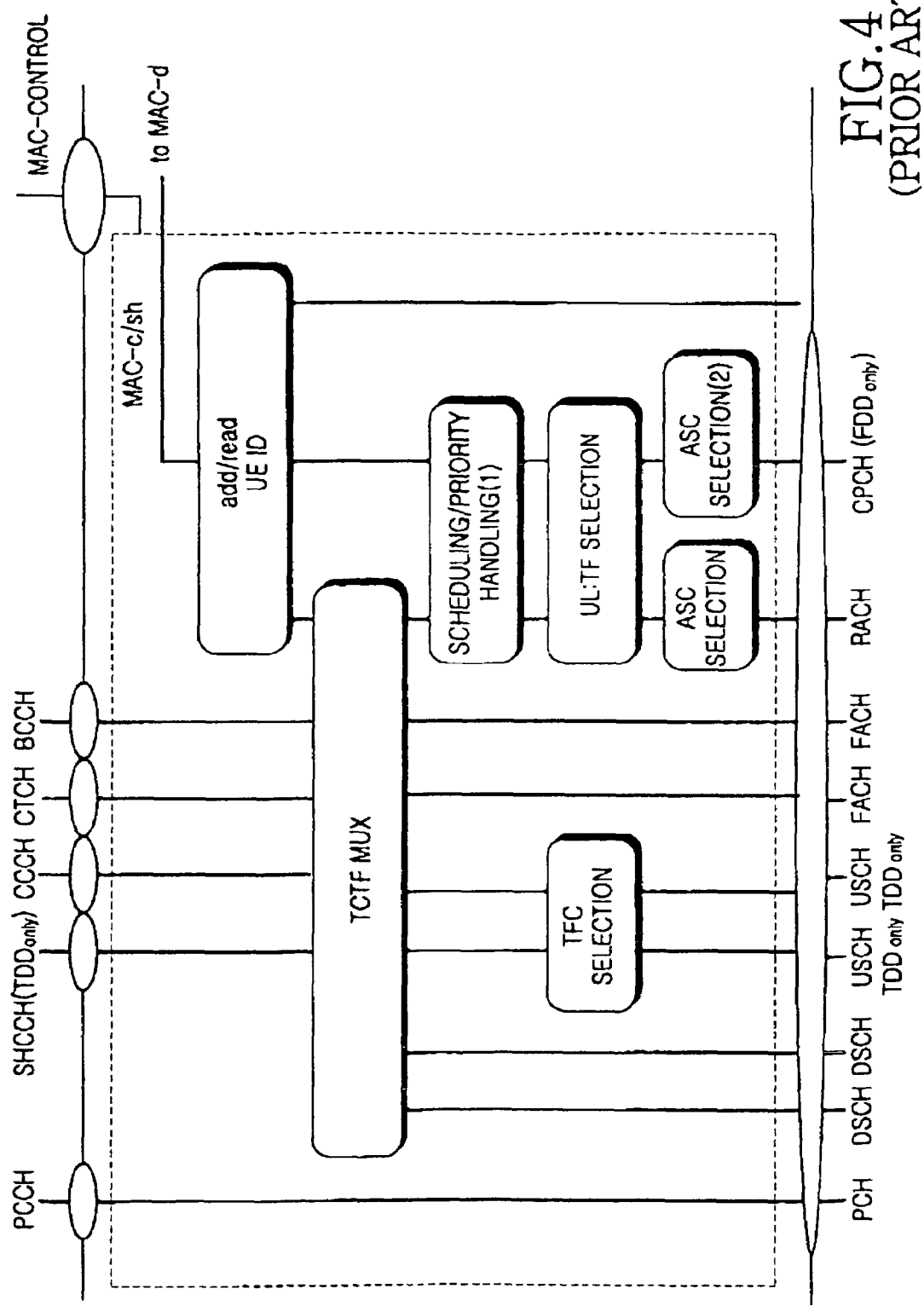
FIG. 4 illustrates a detailed structure of the MAC-c/sh layer shown in FIG. 3.
Figure 5:
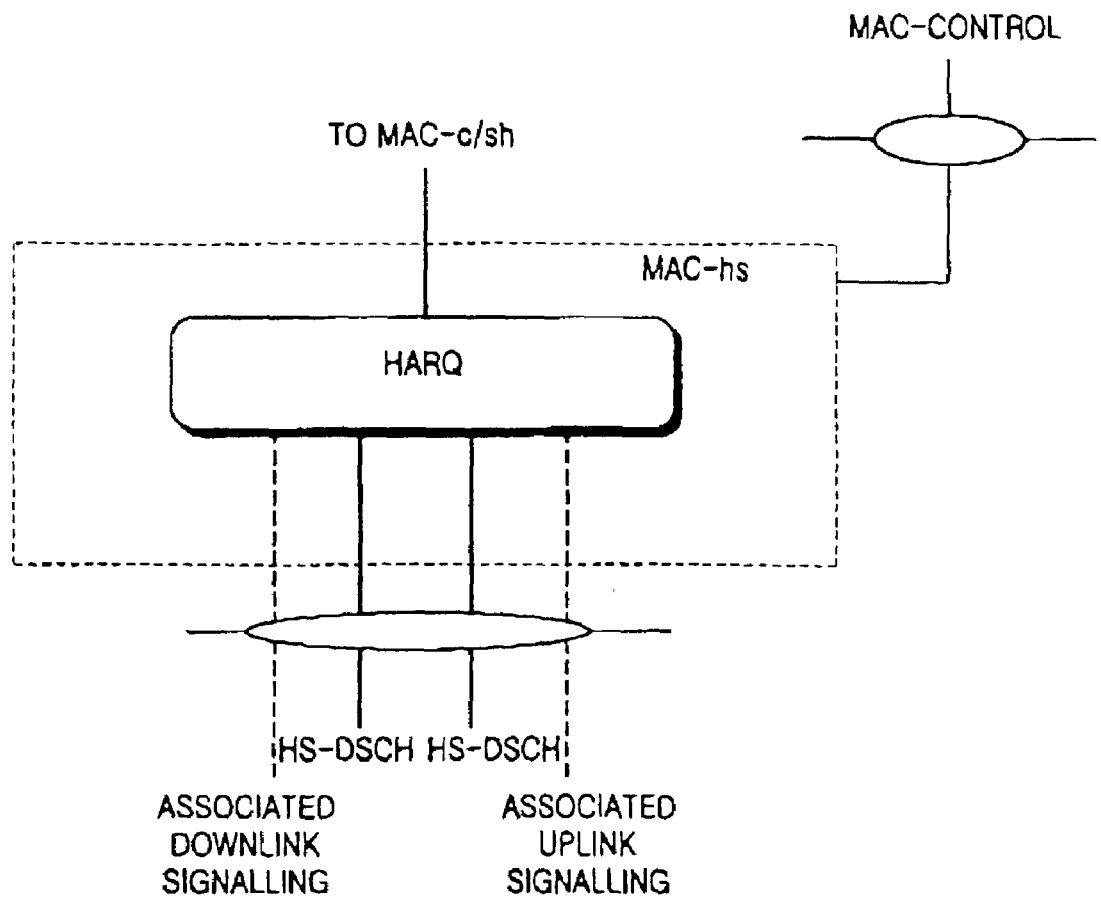
FIG. 5 illustrates a detailed structure of the MAC-hs layer shown in FIG. 3.
Figure 6:
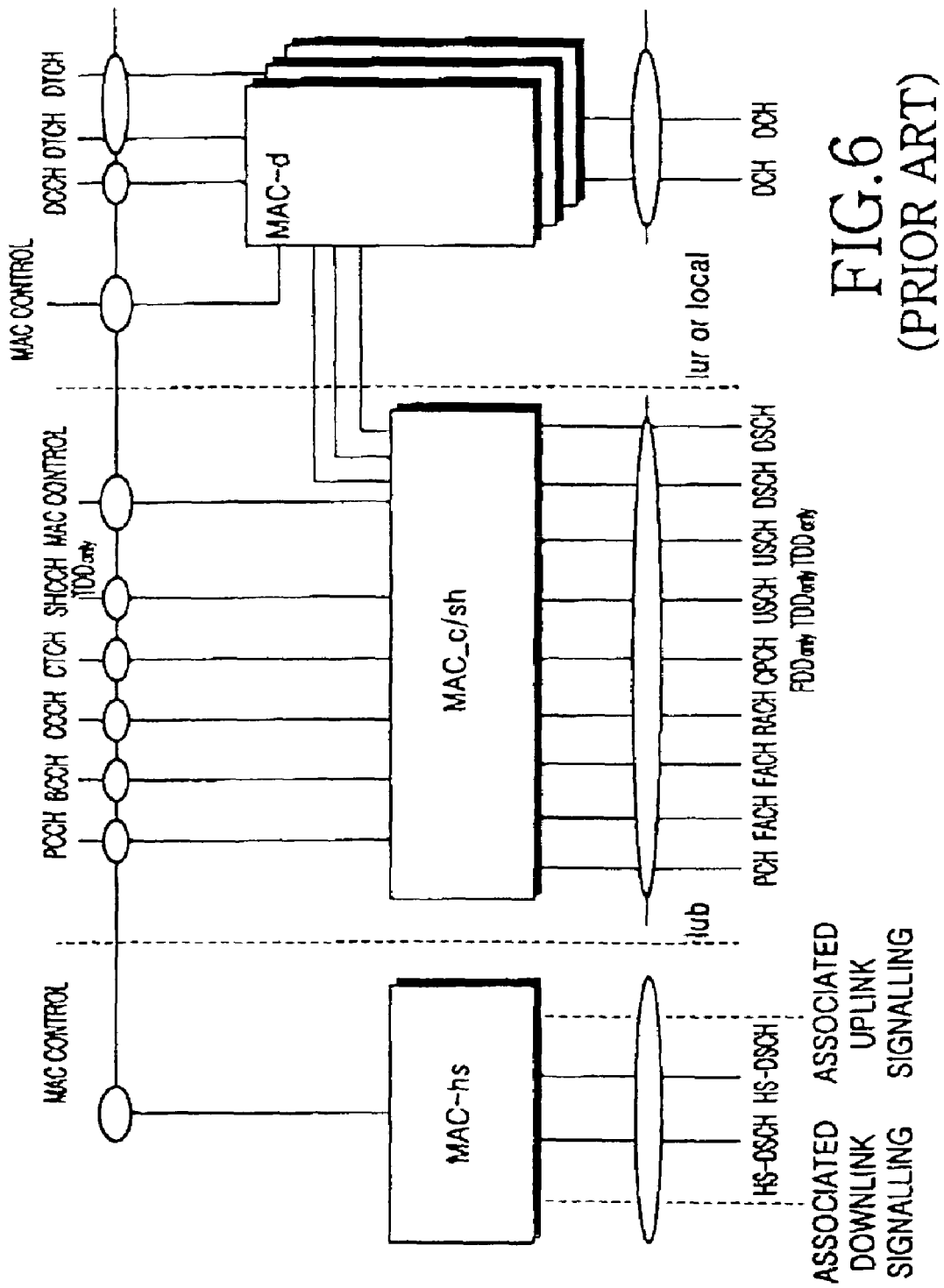
FIG. 6 illustrates a general structure of a MAC layer in the multi-layered protocol structure of a network supporting the HSDPA.
Figure 7:
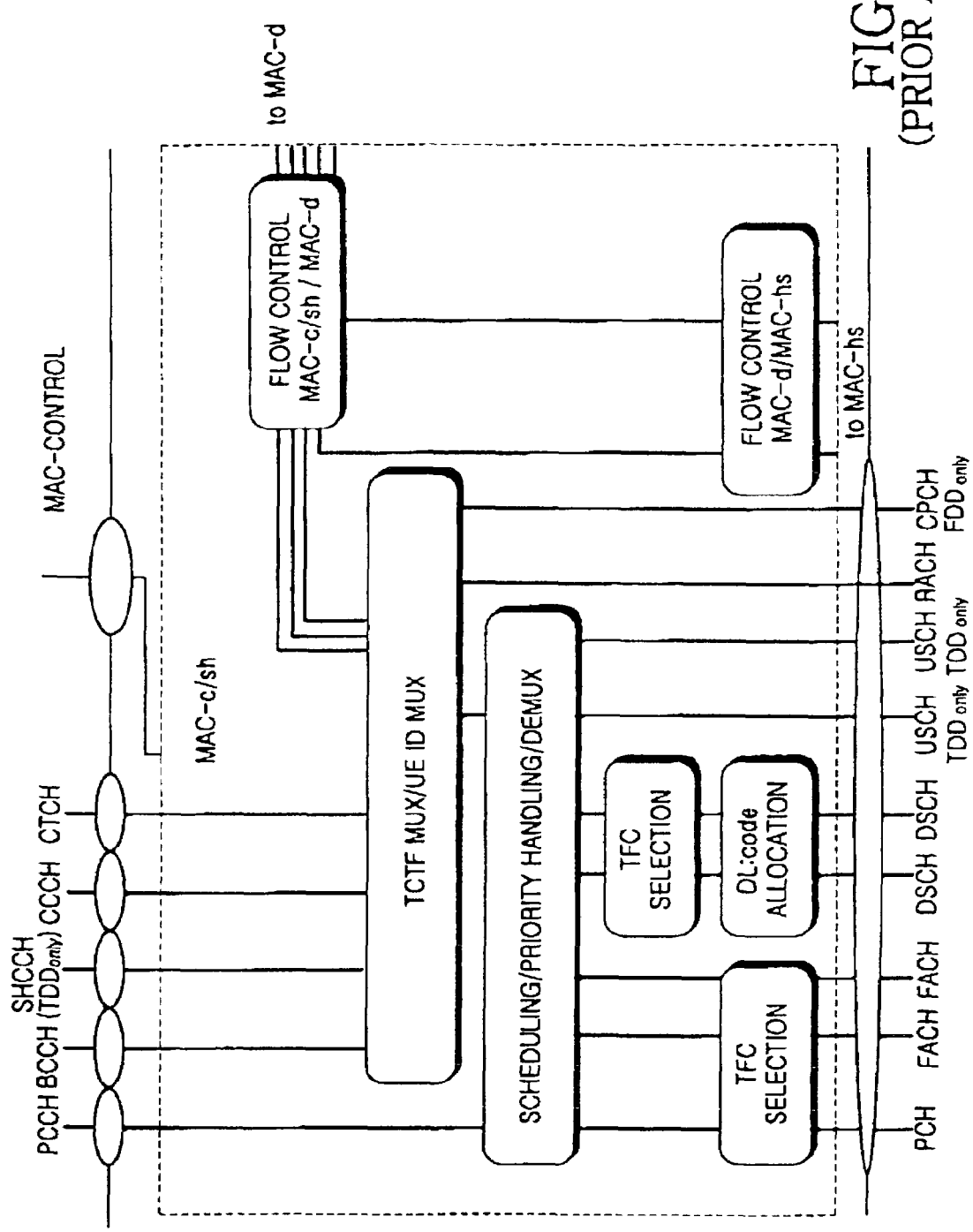
FIG. 7 illustrates a detailed structure of the MAC-c/sh layer shown in FIG. 6.
Figure 8:
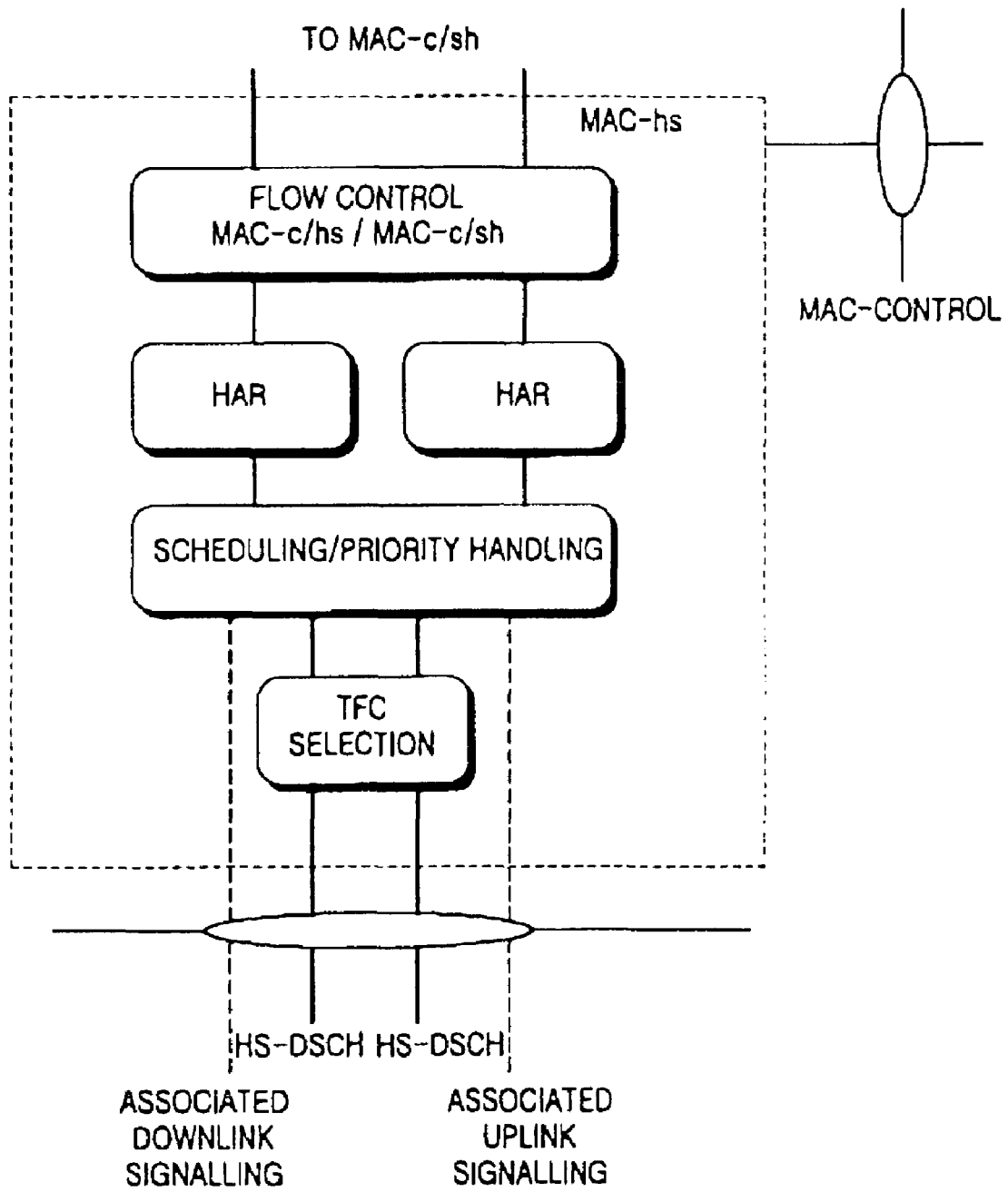
FIG. 8 illustrates a detailed structure of the MAC-hs layer shown in FIG. 6.
Figure 9:
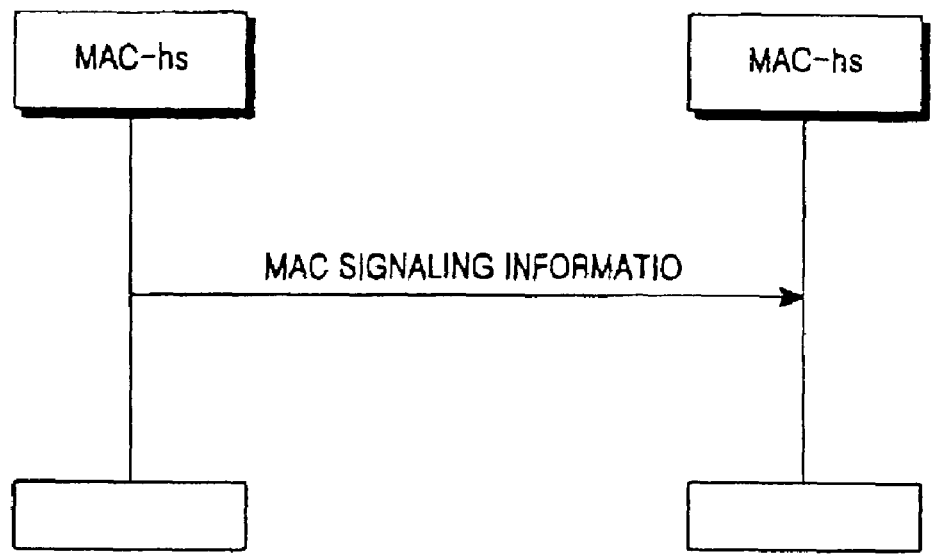
FIG. 9 illustrates an exchange of MAC signaling information between MAC-hs entities in a CDMA communication system supporting the HSDPA according to an embodiment of the present invention.
Figure 10:
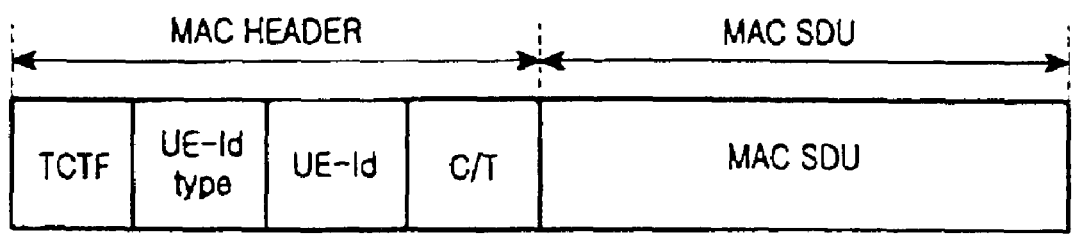
FIG. 10 illustrates a format of MAC PDU (Protocol Data Unit) in an existing CDMA communication system not supporting the HSDPA.

FIG. 9 illustrates an exchange of MAC signaling information between MAC-hs entities according to an embodiment of the present invention. In general, a MAC layer attaches a MAC header to a data block (or RLC PDU (Protocol Data Unit)) transmitted from an RLC layer, thus to generate a transport block. FIG. 10 illustrates a format of MAC PDU in an existing CDMA system not employing the HSDPA. The MAC PDU is comprised of a MAC header and a payload. The MAC header is comprised of TCTF (Target Channel Type Field), UE-Id type, UE-Id, and C/T. TCTF is a field for distinguishing the type of a logical channel, and UE-Id type and UE-Id indicate the identification type and identification of a UE, respectively. Finally, C/T is an indication for distinguishing a logical channel in the same transport channel.

Figure 11:
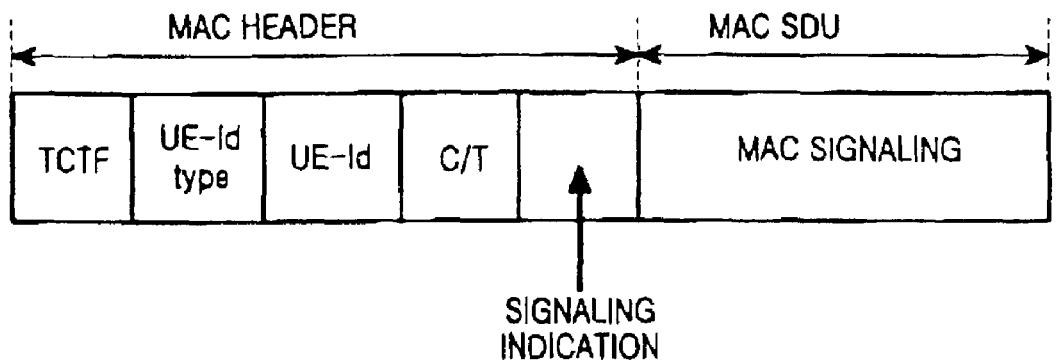
FIG. 11 illustrates a format of MAC PDU in a CDMA communication system supporting the HSDPA according to an embodiment of the present invention.

FIG. 11 illustrates a MAC format with MAC signaling according to an embodiment of the present invention. As illustrated in FIG. 11, a MAC header according to an embodiment of the present invention has a MAC signaling indication field in addition to the existing header information. For example, in the case where the indication field is comprised of one bit, if the indication bit is '0', it indicates a conventional MAC PDU. However, if the indication bit is '1', MAC SDU (Service Data Unit) is comprised of only control information for MAC signaling. The MAC signaling indication field may be located at various positions the MAC header, the position of the indication field is not restricted.

Figure 12:
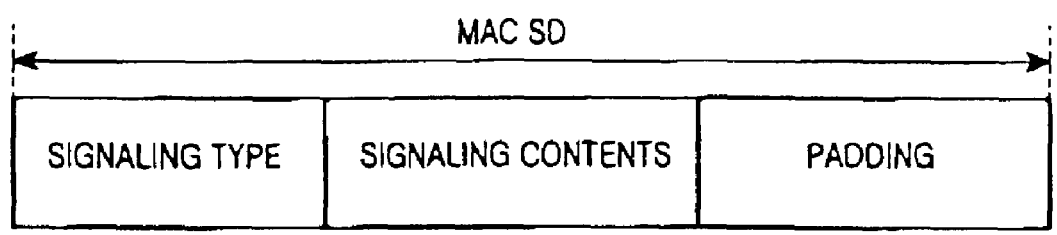
FIG. 12 illustrates an example of a format of the MAC payload shown in FIG. 11.

FIG. 12 illustrates a format of a MAC payload, or MAC SDU of MAC signaling control information according to an embodiment of the present invention. Referring to FIG. 12, the MAC SDU includes a Signaling Type field for distinguishing the type of a signaling message on MAC-hs, and a Signaling Contents field containing control information of the corresponding message. Further, the MAC SDU includes padding bits for padding the data block.

The present invention provides a direct signaling scheme from one MAC-hs entity to another MAC-hs entity. A downlink and an uplink use different physical channels. Therefore, a description of the signaling method will be separately made for the downlink and the uplink.

First, in the case of downlink, a MAC signaling data block can be transmitted over an HS-DSCH channel. This will be described with reference to FIG. 13.

Figure 13:
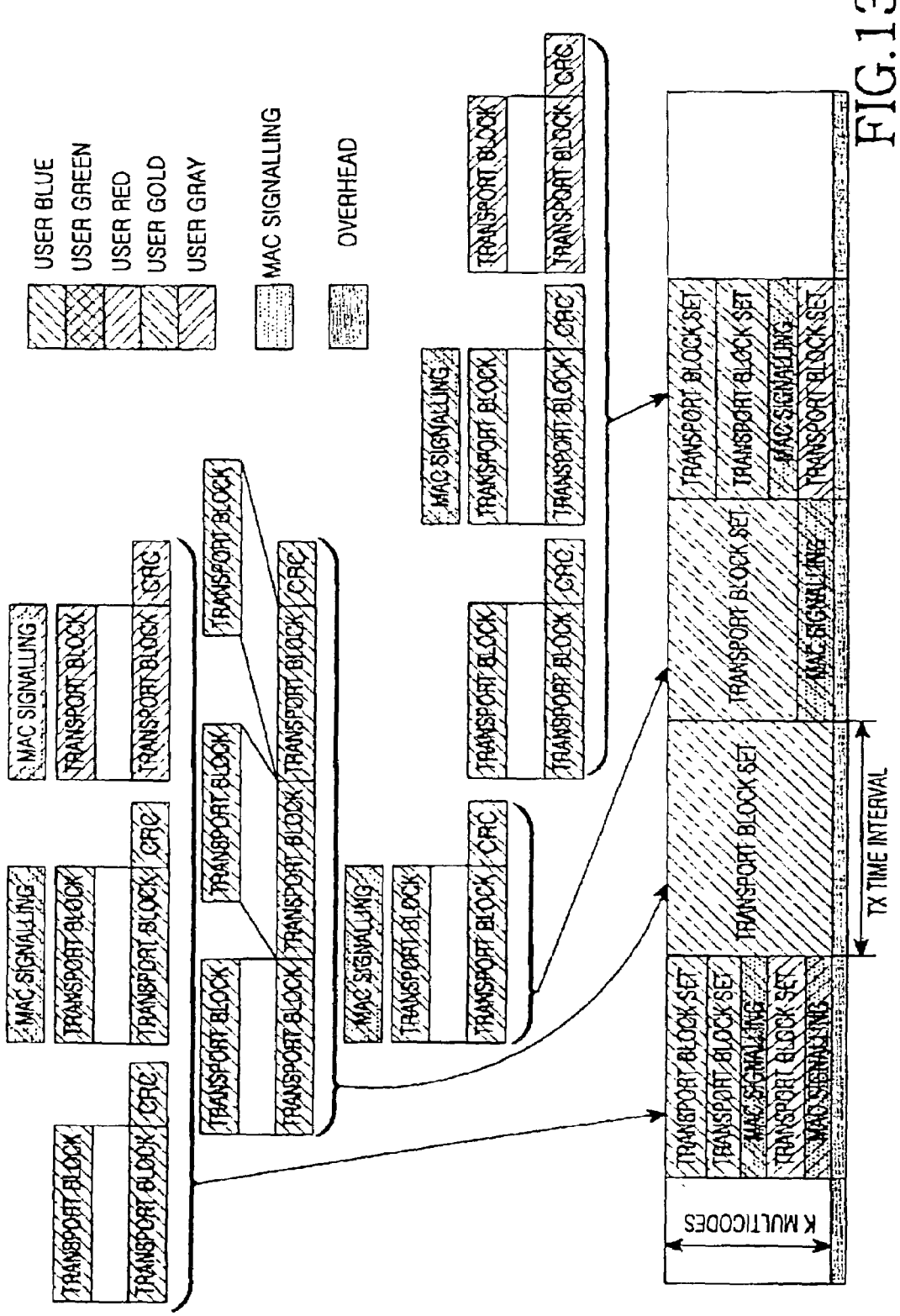
FIG. 13 illustrates a method of transmitting a MAC signaling transport block over a downlink HS-DSCH channel along with a general data transport block according to an embodiment of the present invention.

FIG. 13 illustrates a method of transmitting a MAC signaling transport block over a downlink HS-DSCH channel along with a general data transport block. An HS-DSCH channel transmits a plurality of UE data blocks for a unit TTI (Transmission Time Interval) on a time division basis. Alternatively, a plurality of UE data blocks in one TTI can be segmented into unit codes before being transmitted. A header is attached by MAC-hs to the data block transmitted to the MAC-hs after being segmented by an RLC entity, thus generating a data transport block. The UE data transport blocks are allocated to a plurality of codes in TTI by a scheduling function performed by the MAC-hs, before being transmitted. If signaling on the MAC-hs is requested, a signaling transport block is generated in the structure of FIG. 11. The generated signaling transport block is transmitted over HS-DSCH along with a data transport block of a signaling-requested UE.

Figure 14A:
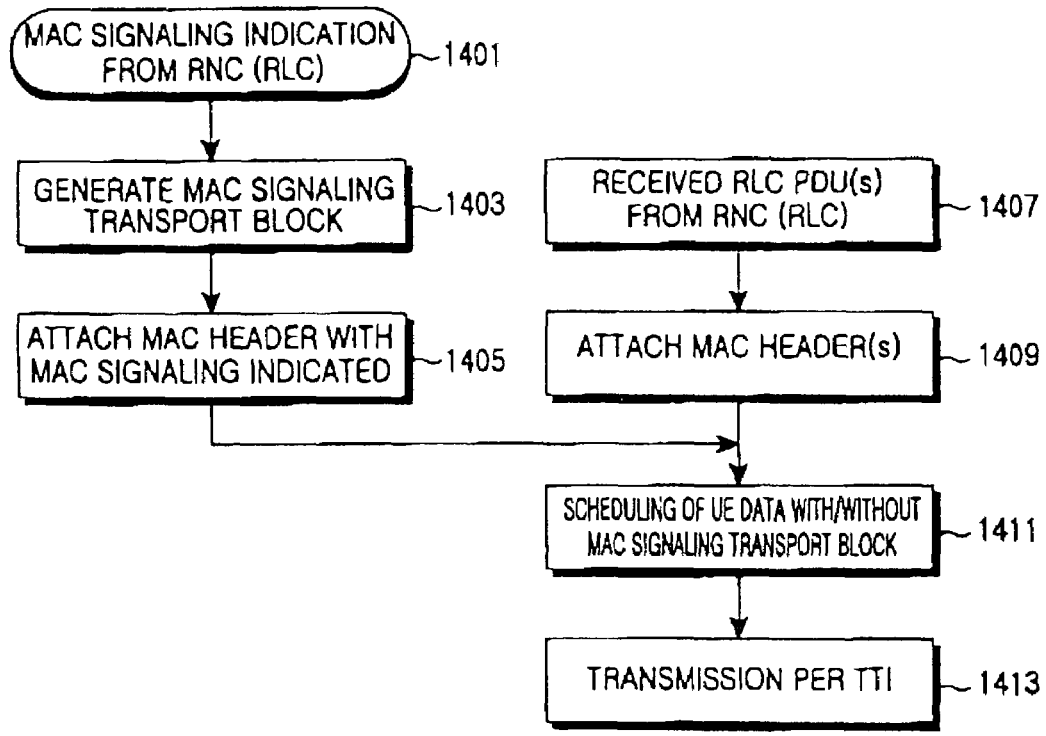
FIG. 14A illustrates a procedure for receiving and processing data or a MAC signaling request from RLC by MAC-hs of a Node B according to an embodiment of the present invention.

FIG. 14A illustrates a procedure for receiving and processing data or a MAC signaling request from RLC by a Node B according to an embodiment of the present invention. Referring to FIG. 14A, a MAC-hs entity receives a data transport block (or RLC PDU) from RLC in step 1407. The MAC-hs attaches a MAC header to the received RLC PDU in step 1409. Meanwhile, the MAC-hs receives a MAC signaling indication signal indicating a MAC signaling request from the RLC in step 1401. Upon receiving the MAC signaling request, the MAC-hs proceeds to step 1403 where it generates a MAC signaling transport block, or MAC signaling message for MAC signaling information. Thereafter, in step 1405, the MAC-hs attaches a MAC header with an indication bit indicating MAC signaling to the MAC signaling message. The MAC header attached in step 1405, being a header indicating signaling, should be distinguished from the MAC header attached in step 1409. In step 1411, the MAC-hs schedules a time point where the RLC PDU or the MAC signaling message with the MAC header, or the RLC PDU and the MAC signaling message are to be transmitted. Here, the MAC signaling message can have a priority over the RLC PDU, a data block. If a transmission point is determined by the scheduling, the MAC-hs proceeds to step 1413, where it transmits the RLC PDU or the MAC signaling message to a UE for each TTI (or per TTI).

So far, the procedure for receiving a signal from RLC by MAC-hs and transmitting the received signal to a UE has been described with reference to FIG. 14A. Next, a procedure for detecting the necessity for signaling transmission by MAC-hs and performing MAC signaling transmission according to an embodiment of the present invention will be described with reference to FIG. 14B.

Figure 14B:
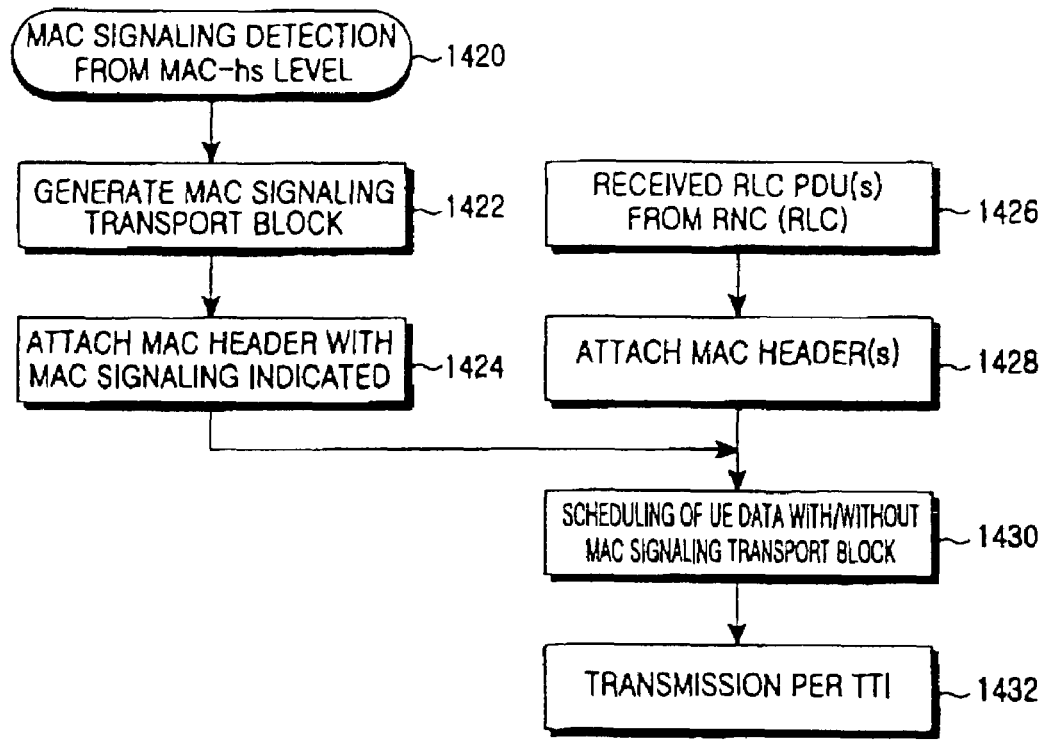
FIG. 14B illustrates a procedure for detecting the necessity for signaling transmission by MAC-hs and performing MAC signaling transmission according to an embodiment of the present invention.

Referring to FIG. 14B, if it is determined from a MAC-hs level that MAC-hs signaling is needed, a MAC-hs entity determines MAC signaling to a counterpart MAC-hs in step 1420. After determining the MAC signaling, the MAC-hs proceeds to step 1422, where it generates a MAC signaling transport block for MAC signaling information. In step 1424, the MAC-hs sets a MAC signaling indication in a MAC header to indicate signaling, and attaches the MAC header to the MAC signaling transport block. In step 1426, the MAC-hs receives a data block (or RLC PDU) from RLC. In step 1428, the MAC-hs attaches a general MAC header of FIG. 10 to the data block or RLC PUD received from the RLC. In step 1430, the MAC-hs schedules the header-attached data block and/or MAC signaling transport block. In step 1432, the MAC-hs transmits the data block or the MAC signaling transport block to a UE at the scheduled time point for each TTI.

The procedures of FIGS. 14A and 14B can be variously used when one MAC-hs is required to transmit a signaling message to its counterpart MAC-hs. Herein, a procedure for exchanging reset information between MAC-hs entities will be described with reference to FIG. 15.

First, a description will be made of a reset process in a MAC-hs layer added as the HSDPA technique is used in an embodiment of the present invention. A conventional RLC reset process is defined to cope with a protocol error in a W-CDMA communication system not employing the HSDPA. However, the conventional RLC reset process causes unnecessary data transmission in a MAC layer due to the use of the HSDPA technique. When the HSDPA is used, a new MAC layer, i.e., a MAC-hs layer for supporting the HSDPA is required, and as the MAC-hs layer performs an HARQ function, a Node B must perform a buffering function in order to transmit and retransmit data blocks. Therefore, a data block transmitted from RLC is buffered (temporarily stored) in the MAC-hs layer before being transmitted over a radio channel. At this point, if an RLC reset process is performed due to a protocol error occurring on the RLC, the data block buffered in the MAC-hs layer before the RLC reset process is transmitted to a counterpart MAC-hs layer over a physical layer. However, when the counter part MAC-hs layer, i.e., the MAC-hs layer of the reception side receives the data block, the data block is discarded in an RLC layer of the reception side according to the RLC reset process. Therefore, when the RLC reset process is performed, the data block transmission by the MAC-hs layer is an unnecessary transmission. Further, the data block is buffered until the RLC reset process is ended, causing unnecessary use of a memory. In addition, the MAC-hs layer of the reception side should also reset retransmission information. This is because when data blocks or data packets received from the UTRAN includes a data block from which an error is detected in the MAC-hs layer, the MAC-hs must temporarily perform buffering for retransmission on the defective data block. As a result, a memory on the MAC-hs layer of the reception side is unnecessarily used, and the defective data block is also unnecessarily transmitted to an upper layer, or the RLC layer of the reception side.

Figure 15:
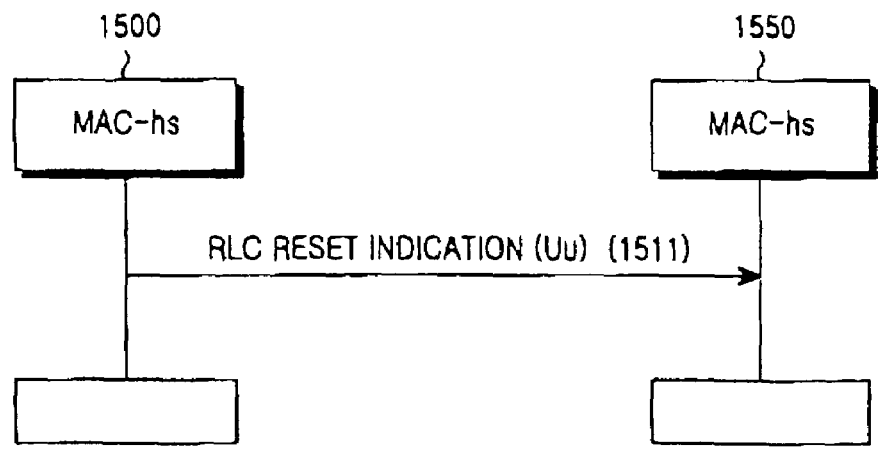
FIG. 15 is a signal flow diagram illustrating a procedure for exchanging reset information between MAC-hs layers in a CDMA communication system supporting the HSDPA.

FIG. 15 is a signal flow diagram illustrating a procedure for exchanging reset information between MAC-hs layers based on the MAC reset process. If MAC-hs of the transmission side is reset as RLC of the transmission side is reset, all data blocks stored in the MAC-hs of the transmission side are discarded. Accordingly, the corresponding data blocks stored in the MAC-hs of the transmission side and MAC-hs of the reception side are unnecessary, so they must be discarded. Therefore, the MAC-hs of the reception side should also be reset, as the MAC-hs of the transmission side is reset. To this end, in FIG. 15, MAC-hs 1500 of the transmission side transmits reset information RLC RESET Indication 1511 indicating that the MAC-hs 1500 of the transmission side is reset, to MAC-hs 1550 of the reception side. Upon receiving the reset information, the MAC-hs

1550 of the reception side discards the corresponding data blocks stored in its internal memory, and then, is reset. Here, for a message indicating the reset information transmitted from the MAC-hs 1500 of the transmission side to the MAC-hs 1550 of the reception side, a MAC-hs signaling message between the MAC-hs layers is used.

Figure 16:
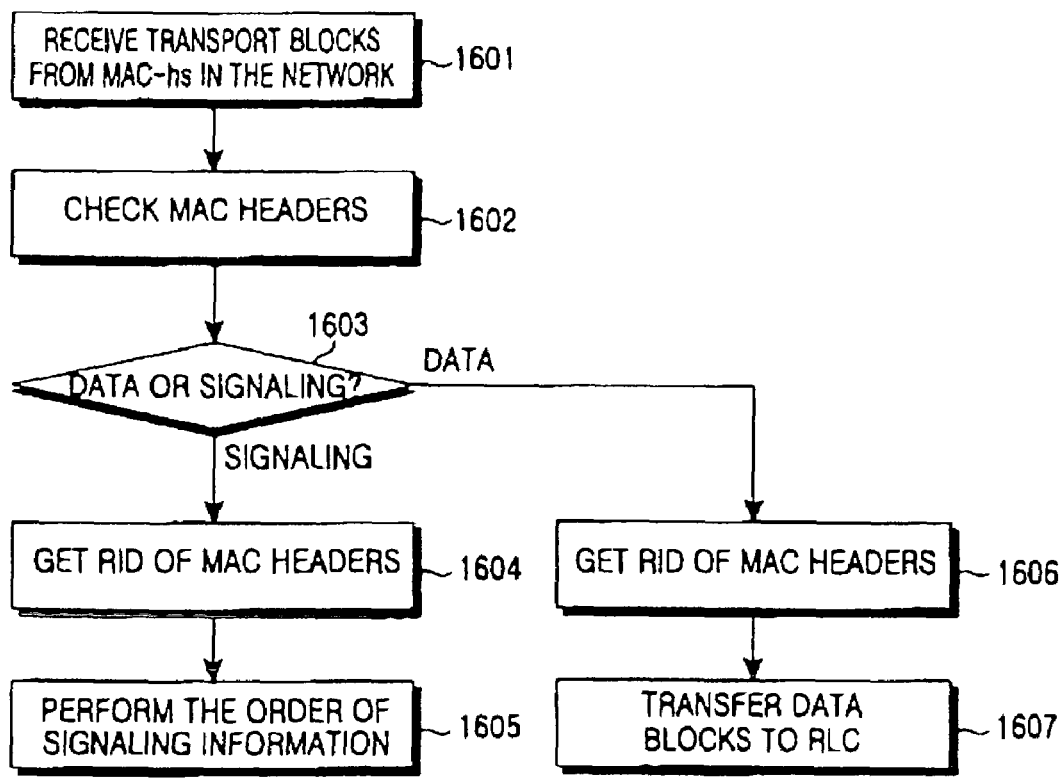
FIG. 16 is a signal flow diagram illustrating a procedure for receiving a MAC signaling transport block by a UE in a CDMA communication system supporting the HSDPA according to an embodiment of the present invention.

FIG. 16 illustrates a procedure for receiving a MAC signaling transport block transmitted by MAC-hs in a radio network by a UE according to an embodiment of the present invention. Referring to FIG. 16, upon receiving a data block transmitted by MAC-hs of a network in step 1601, MAC-hs of a UE proceeds to step 1602 where it checks a MAC header included in the received data block. Thereafter, the MAC-hs determines in step 1603 whether each data transport block is data or signaling information, based on the result of the check. If the data block is signaling information, the MAC-hs proceeds to step 1604 where it removes a MAC header from the signaling information. Thereafter, in step 1605, the MAC-hs performs the MAC header-removed signaling information, i.e., an order of the control information.

However, if the data block is data information, the MAC-hs removes a MAC-header from the data information in step 1606, and then proceeds to step 1607. In step 1607, the MAC-hs transmits the MAC header-removed data information. The MAC header-removed data information is MAC SDU, and the MAC SDU is transmitted to an upper RLC entity by the MAC-hs.

Hitherto, the MAC signaling transmission method for the downlink has been described. Next, a MAC signaling transmission method for an uplink will be described. The MAC signaling transmission for the uplink can be performed using an additional dedicated physical control channel (DPCCH) in response to a MAC signaling request.

Figure 17:
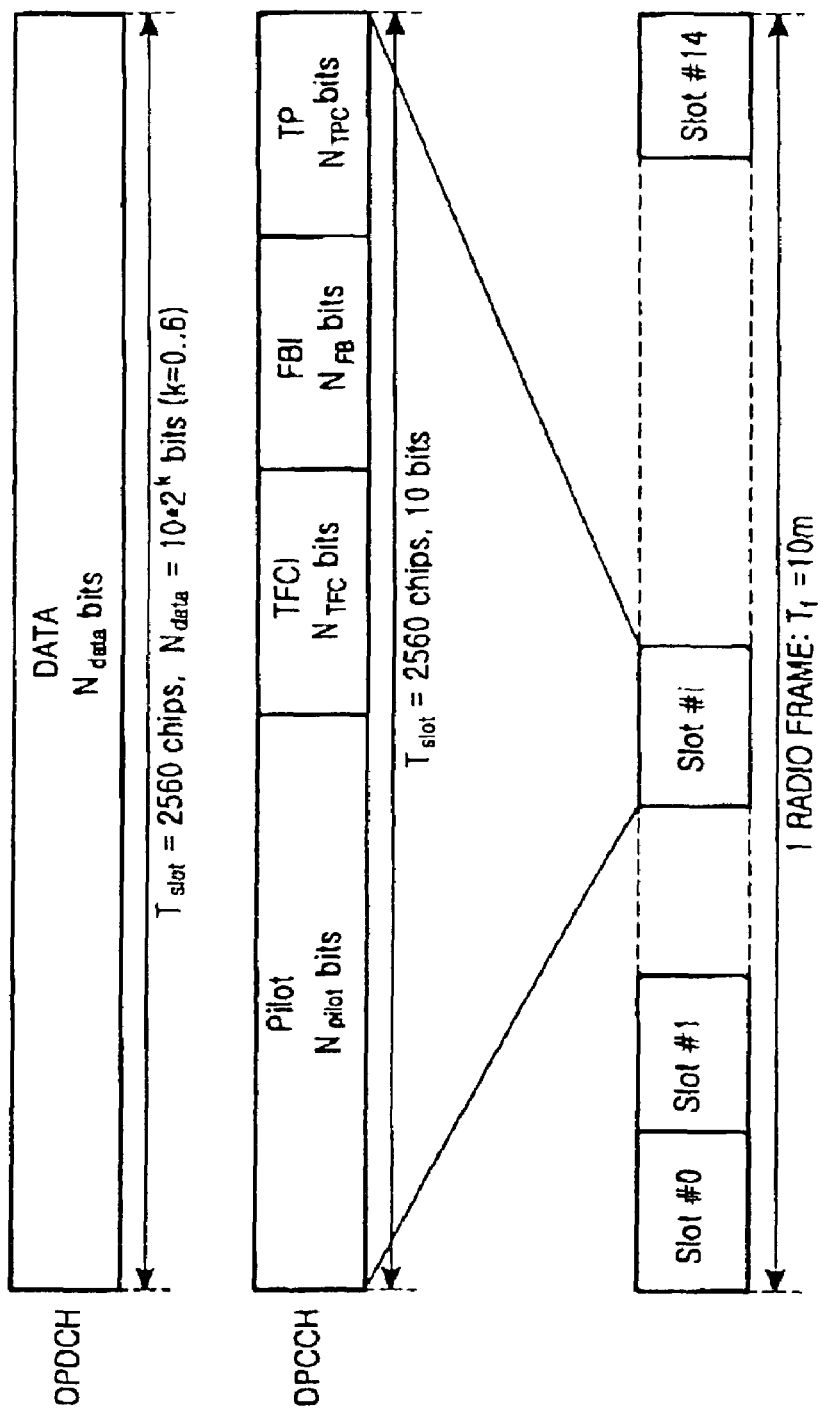
FIG. 17 illustrates a general structure of an uplink dedicated physical channel in a CDMA communication system.

FIG. 17 illustrates a structure of a general uplink dedicated physical channel (DPCH). Referring to FIG. 17, one radio frame with a period $T_f=10$ ms is comprised of 15 slots, and a dedicated physical data channel (DPDCH) per slot has $N_{data}$ bits according to a spreading factor (SF). A dedicated physical control channel (DPCCH) per slot includes Pilot, TFCI (Transport Format Combination Indication), FBI (Feedback Information) and TPC (Transmit Power Control) bits, and SF is fixed to 256.

Figure 18:
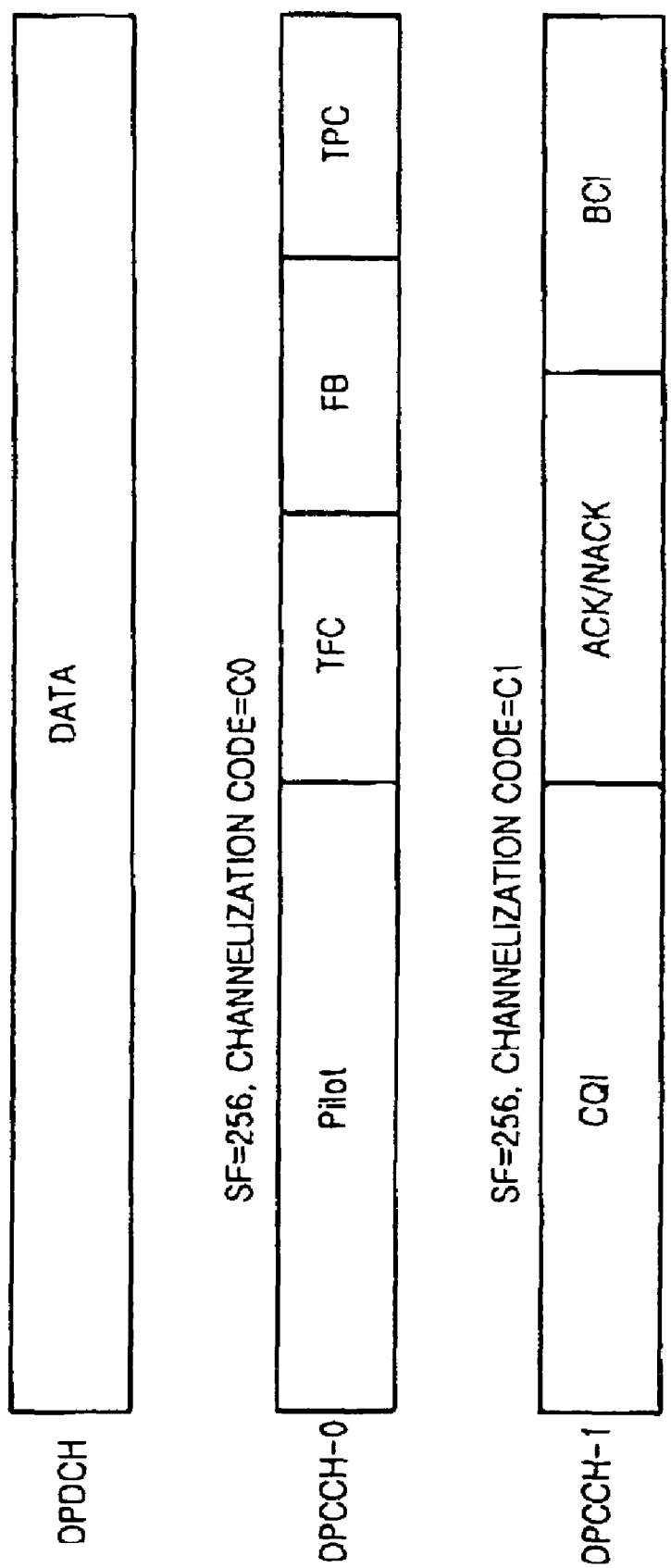
FIG. 18 illustrates a general structure of an uplink dedicated physical channel in a CDMA communication system supporting the HSDAP.

FIG. 18 illustrates a structure of an uplink dedicated physical channel (DPCH) when the HSDPA is used. As illustrated in FIG. 18, the uplink dedicated physical channel includes CQI (Channel Quality Indication), ACK/NACK (Acknowledgement/Non-Acknowledgement) which is an HARQ ACK indication, and BCI (Best Cell Indication) for selecting a best cell for the FCS, in addition to the control bits of FIG. 17. The channel structure of FIG. 18 uses code division multiplexing (CDM) taking into consideration compatibility with the existing system not employing the HSDPA. That is, the uplink dedicated physical channel transmits CQI, ACK/NACK and BCI information bits for the HSDPA by allocating new codes, while maintaining the general dedicated physical control channel DPCCH-0.

Figure 19:
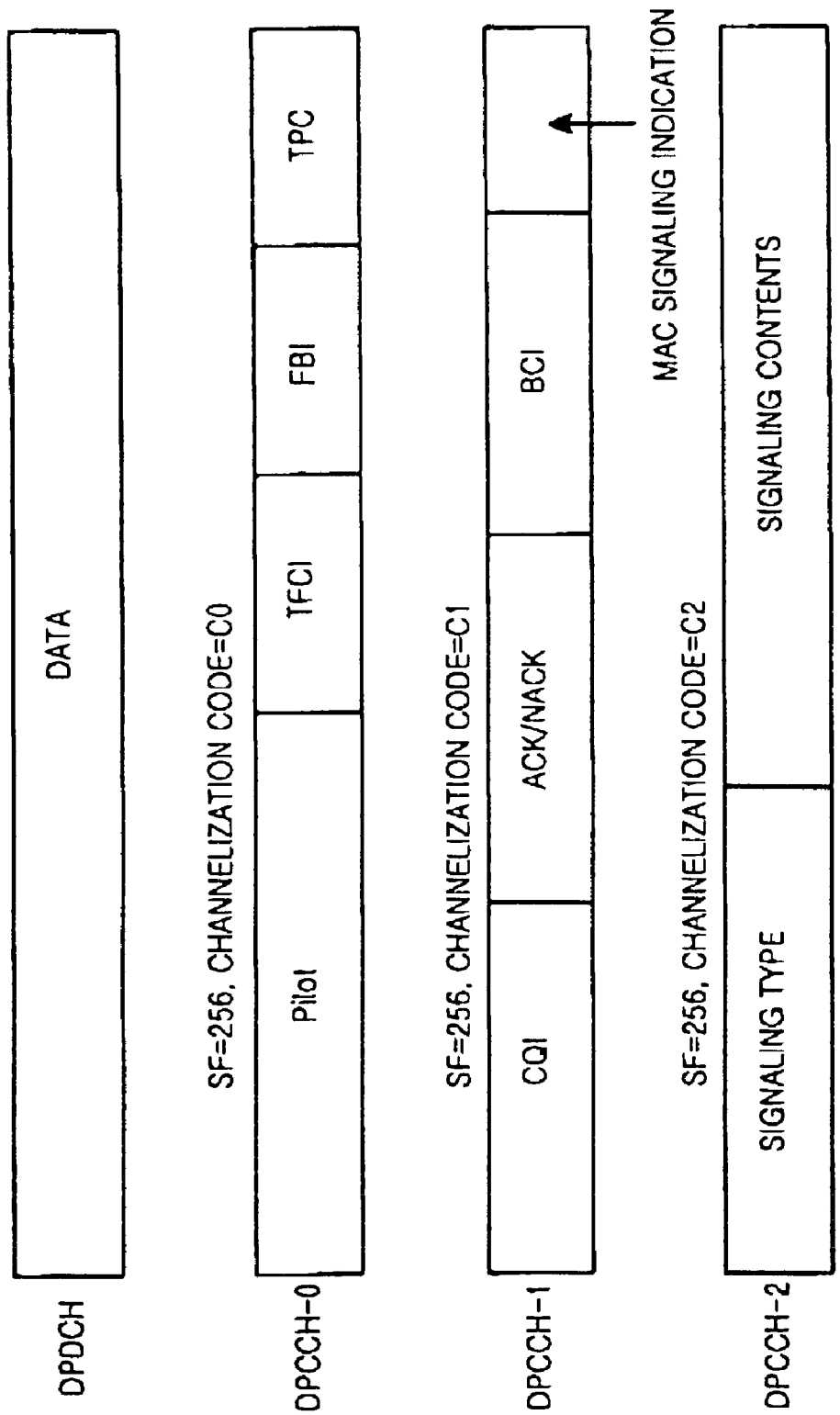
FIG. 19 illustrates a structure of a structure of an uplink dedicated physical channel in a CDMA communication system supporting the HSDPA according to an embodiment of the present invention.

FIG. 19 illustrates a method for transmitting MAC signaling over an uplink according to an embodiment of the present invention. Referring to FIG. 19, a field for transmitting MAC signaling indication is added to a dedicated physical control channel DPCCH-1 for supporting the HSDPA. Meanwhile, signaling information (or contents) of the type similar to the MAC signaling type for the downlink described in conjunction with FIG. 12 is transmitted on a CDM basis by allocating a new uplink code (indicating DPCCH-2). The MAC signaling indication on the dedicated physical control channel DPCCH-1 indicates presence/absence of MAC signaling control information. When indicated by this indication, MAC signaling control information is transmitted over the dedicated physical control channel DPCCH-2. This control information includes a signaling type and the contents of necessary control information.

Figure 20:
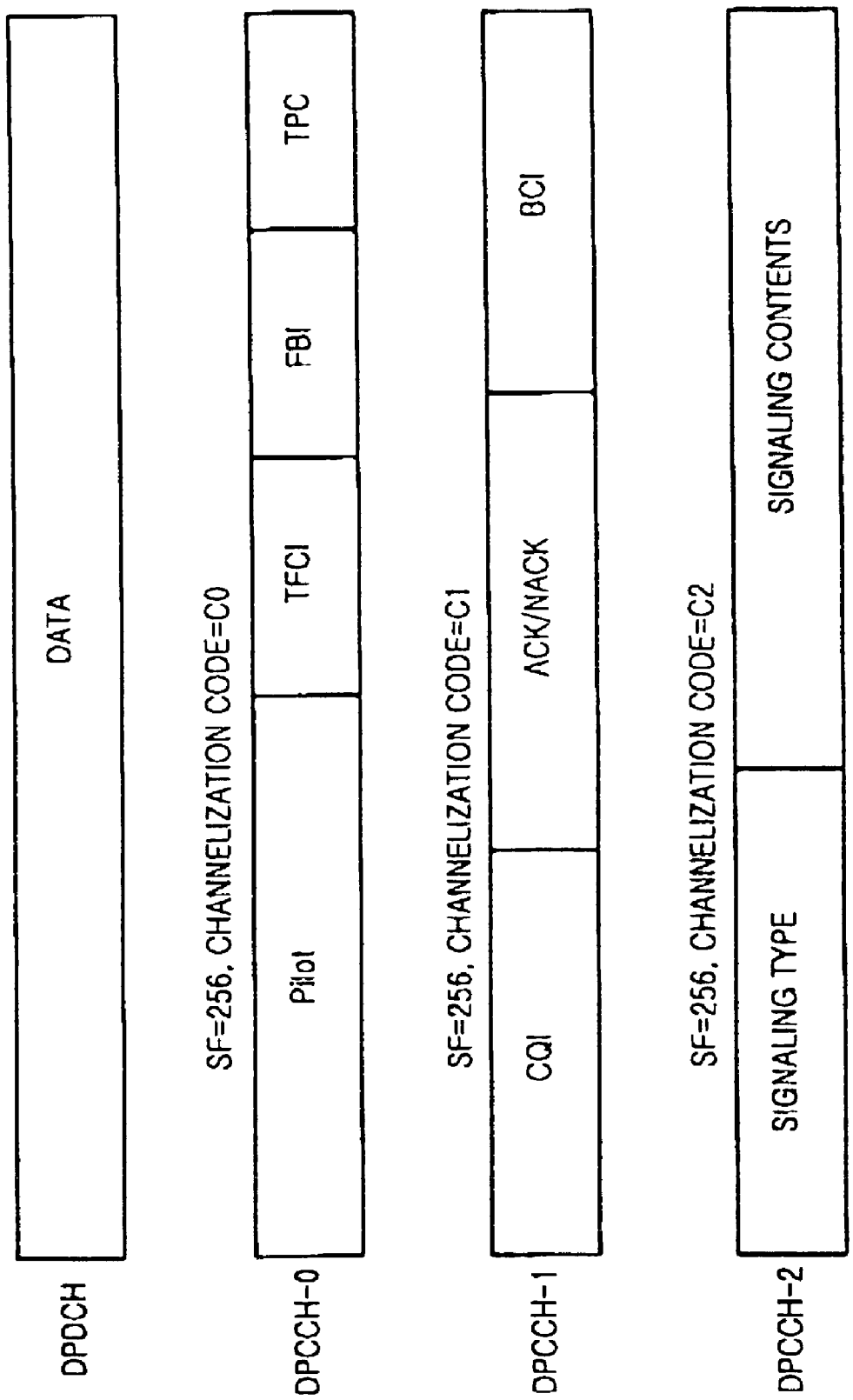
FIG. 20 illustrates another structure of an uplink dedicated physical channel in a CDMA communication system supporting the HSDPA according to an embodiment of the present invention.

FIG. 20 illustrates another possible method for transmitting MAC signaling over an uplink according to an embodiment of the present invention. Referring to FIG. 20, this method previously selects a code corresponding to DPCCH-2 for transmitting MAC signaling control information and then allows a receiver of a network to determine presence/absence of MAC signaling based on a level of power received, instead of determining presence/absence of MAC signaling through the MAC signaling indication of FIG. 19. This MAC signaling method can be used in correcting an error of an HARQ ACK message on MAC-hs, and transmitting reset information of MAC-hs.

Figure 21:
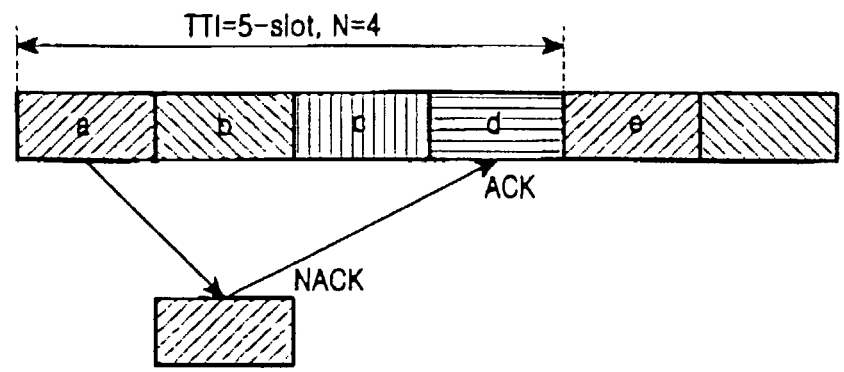
FIG. 21 illustrates an error occurring in an ACK/NACK signal when the synchronous/synchronous HARQ is used in a CDMA communication system supporting the HSDPA.

FIG. 21 illustrates an error occurring in an ACK/NACK signal when the synchronous/synchronous HARQ is used. In the synchronous/synchronous HARQ, an ACK/NACK signal is transmitted over an uplink for each data transport block transmitted over a downlink for TTI. Although a UE transmitted a NACK signal to a network due to an error occurred in a received data transport block 'a', the network may receive an ACK signal due to an error on a radio channel. In this case, the network transmits a new data block 'e', and the UE mistakes the new data block 'e' for a retransmitted data block of the defective data block 'a', and combines the received data block 'e' with the previously received data block 'a', thus misconceiving that an error has occurred again. Therefore, the UE transmits a NACK message (or a retransmission request message) again, and the network misconceives that an error has occurred in the transmitted data block 'e'. For this reason, the synchronous/synchronous HARQ cannot correct an error.

Figure 22:
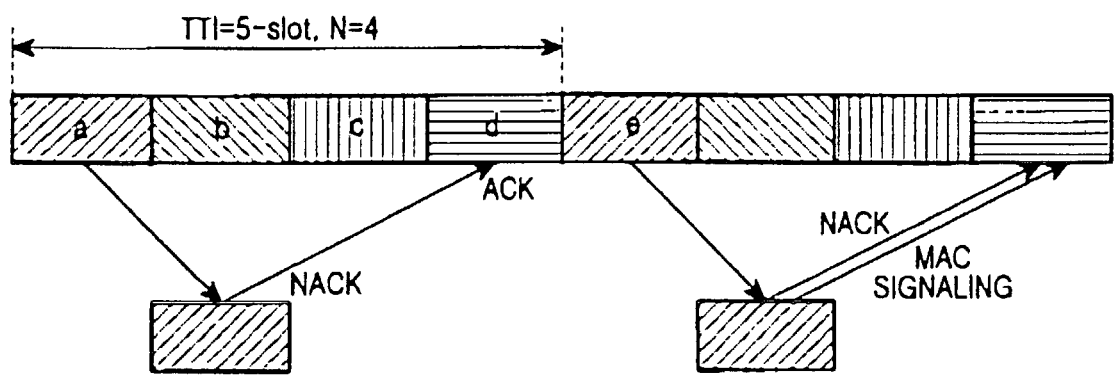
FIG. 22 illustrates a method for correcting an error through signaling by MAC-hs of a UE when a NACK error occurs in the synchronous/synchronous HARQ according to an embodiment of the present invention.

FIG. 22 illustrates a method for correcting an error through signaling by MAC-hs of a UE (or reception side) when a NACK error occurs in the synchronous/synchronous HARQ according to an embodiment of the present invention. When transmitting a NACK message through MAC signaling, this method transmits a second-or-later transmitted NACK message for the same data block along with signaling information containing the frequency of transmissions, so that a network can recognize that the previously transmitted data block 'a' should be retransmitted.

As described above, the present invention can effectively transmit control information that should be exchanged directly between MAC-hs layers. For example, the present invention can correct an ACK/NACK error in the synchronous/synchronous HARQ, and transmit reset information on the MAC-hs. Meanwhile, by enabling signaling between MAC-hs layers according to the present invention, in order for a MAC entity located in a radio network controller to support the HSDPA in a network supporting the HSDPA, the MAC-hs is located in a Node B and the MAC-hs further performs HARQ function in addition to the conventional MAC entity's function, so that an exchange of a general signaling message as well as the new signaling message may be necessary.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A signaling method between a MAC (Medium Access Control) layer entity of a transmission apparatus and a MAC layer entity of a reception apparatus in a wireless communication system including the transmission apparatus and the reception apparatus, comprising the steps of:

transmitting by the MAC layer entity of the transmission apparatus a MAC signaling message including control information and a signaling indication indicating selective transmission of the control information according to a value of the signaling indication; and determining by the MAC layer entity of the reception apparatus whether the MAC signaling message includes the signaling indication, and receiving the control information included in the MAC signaling message if the MAC signaling message includes the signaling indication.

2. The signaling method of claim 1, wherein the signaling indication and the control information are transmitted over different dedicated physical control channels, and the control information is transmitted over the same dedicated physical control channel as a signaling type information for distinguishing the MAC signaling message.

3. The signaling method of claim 1, wherein the MAC signaling message comprises the control information and a header containing the signaling indication.

4. The signaling method of claim 3, wherein the control information includes signaling type information for distinguishing the MAC signaling message.

5. A method for performing signaling to a MAC (Medium Access Control) layer entity of a reception apparatus by a MAC layer entity of a transmission apparatus under a control of a radio link control (RLC) entity in a wireless communication system including the transmission apparatus and the reception apparatus, comprising the steps of:

generating a MAC signaling message including the signaling transport block and a signaling indication indicating selective transmission of a signaling transport block according to a value of the signaling indication;

scheduling transmission time points of the MAC signaling message; and transmitting the MAC signaling message to the MAC layer entity of the reception apparatus at the corresponding scheduled transmission time points.

6. The method of claim 5, wherein a priority is given to the MAC signaling message while transmission time points of the MAC signaling message is scheduled rather than a MAC data message.

7. The method of claim 5, wherein the signaling indication and the signaling transport block are transmitted over different dedicated physical control channels, and the signaling transport block is transmitted over the same dedicated physical control channel as a signaling type information for distinguishing the MAC signaling message.

8. The method of claim 5, wherein the MAC signaling message comprises the signaling transport block and a header containing the signaling indication.

9. The method of claim 8, wherein the signaling transport block includes signaling type information for distinguishing the MAC signaling message.

10. A method for performing signaling to a MAC (Medium Access Control) layer entity of a transmission apparatus by a MAC layer entity of a reception apparatus in a wireless communication system including the transmission apparatus and the reception apparatus, comprising the steps of:

receiving a MAC message transmitted from the MAC layer entity of the transmission apparatus and determining whether the MAC message includes a signaling indication indicating selective transmission of control information according to a value of the signaling indication; and determining the control information included in the MAC message if the MAC message includes the signaling indication.

11. The method of claim 10, wherein the signaling indication and the control information are transmitted over different dedicated physical control channels, and the control information is transmitted over the same dedicated physical control channel as a signaling type information for distinguishing a MAC signaling message.

12. The method of claim 10, wherein the MAC message comprises the control information and a header containing the signaling indication.

13. The method of claim 12, wherein the control information includes signaling type information for distinguishing a MAC signaling message.

* * * * *